US012500518B2

(12) United States Patent
Chan

(10) Patent No.: US 12,500,518 B2
(45) Date of Patent: Dec. 16, 2025

(54) BOOST CONVERTER FOR INCREASING CIRCUITRY STABILITY

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 374 days.

(21) Appl. No.: 18/182,711

(22) Filed: Mar. 13, 2023

(65) Prior Publication Data
US 2023/0336079 A1 Oct. 19, 2023

(30) Foreign Application Priority Data

Apr. 15, 2022 (TW) .................................. 111114391

(51) Int. Cl.
*H02M 3/158* (2006.01)
*H02M 1/00* (2007.01)
*H02M 7/217* (2006.01)

(52) U.S. Cl.
CPC ......... *H02M 3/158* (2013.01); *H02M 1/0025* (2021.05); *H02M 7/217* (2013.01)

(58) Field of Classification Search
CPC .... H02M 1/42; H02M 1/4208; H02M 1/4225; H02M 3/156; H02M 3/158; H02M 3/1566; H02M 7/00; H02M 7/02; H02M 7/04; H02M 7/06; H02M 7/12; H02M 7/30; H02M 7/40; G05F 1/565; G05F 1/462; G05F 1/56; G05F 1/575; G05F 1/46
See application file for complete search history.

(56) References Cited

U.S. PATENT DOCUMENTS

| 4,761,725 A | * | 8/1988 | Henze | H02M 1/4225 323/283 |
| 6,917,185 B2 | * | 7/2005 | Okamoto | H02M 1/4225 323/283 |
| 9,608,518 B2 | | 3/2017 | Yin et al. | |
| 11,349,389 B2 | | 5/2022 | Chan | |

FOREIGN PATENT DOCUMENTS

TW  202205798 A  2/2022

OTHER PUBLICATIONS

Chinese language office action dated Nov. 16, 2022, issued in application No. TW 111114391.

* cited by examiner

*Primary Examiner* — Alex Torres-Rivera
*Assistant Examiner* — Ularislao Cordova
(74) *Attorney, Agent, or Firm* — McClure, Qualey & Rodack, LLP

(57) ABSTRACT

A boost converter includes a bridge rectifier, a first capacitor, a supply circuit, a first inductor, a current compensation circuit, a power switch element, an output stage circuit, a feedback compensation circuit, and an MCU (Microcontroller Unit). The bridge rectifier generates a rectified voltage according to a first input voltage and a second input voltage. The first inductor receives the rectified voltage. The output stage circuit is coupled to the first inductor and the current compensation circuit, and generates an output voltage. The feedback compensation circuit generates a feedback voltage according to the output voltage. The MCU monitors and limits a duty cycle of a clock voltage. If the duty cycle reaches a maximum threshold value, the MCU will enable the current compensation circuit to provide an additional current, thereby increasing the output power of the boost converter.

7 Claims, 3 Drawing Sheets

BOOST CONVERTER FOR INCREASING CIRCUITRY STABILITY

CROSS REFERENCE TO RELATED APPLICATIONS

This application claims priority of Taiwan Patent Application No. 111114391 filed on Apr. 15, 2022, the entirety of which is incorporated by reference herein.

BACKGROUND OF THE INVENTION

Field of the Invention

The disclosure generally relates to a boost converter, and more specifically, to a boost converter for increasing circuitry stability.

Description of the Related Art

Since notebook computers used for gaming require large amounts of power, a conventional design generally enhances the overall output power by increasing the duty cycle of its power switch element. However, the large duty cycle may easily lead to oscillations of circuitry and a decline in stability. Accordingly, there is a need to propose a novel solution for solving the problems of the prior art.

BRIEF SUMMARY OF THE INVENTION

In an exemplary embodiment, the invention is directed to a boost converter that includes a bridge rectifier, a first capacitor, a supply circuit, a first inductor, a current compensation circuit, a power switch element, an output stage circuit, a feedback compensation circuit, and an MCU (Microcontroller Unit). The bridge rectifier generates a rectified voltage according to a first input voltage and a second input voltage. The first capacitor stores the rectified voltage. The supply circuit generates a supply voltage according to the rectified voltage. The first inductor receives the rectified voltage. The power switch element selectively couples the first inductor to a ground voltage according to a clock voltage. The output stage circuit is coupled to the first inductor and the current compensation circuit, and generates an output voltage. The feedback compensation circuit generates a feedback voltage according to the output voltage. The feedback compensation circuit includes a linear optical coupler. The MCU is supplied by the supply voltage, and generates the clock voltage according to the feedback voltage. The MCU monitors and limits a duty cycle of a clock voltage. If the duty cycle reaches a maximum threshold value, the MCU will enable the current compensation circuit to provide an additional current, thereby increasing the output power of the boost converter.

In some embodiments, the bridge rectifier includes a first diode, a second diode, a third diode, and a fourth diode. The first diode has an anode coupled to a first input node for receiving the first input voltage, and a cathode coupled to a first node for outputting the rectified voltage. The second diode has an anode coupled to a second input node for receiving the second input voltage, and a cathode coupled to the first node. The third diode has an anode coupled to the ground voltage, and a cathode coupled to the first input node. The fourth diode has an anode coupled to the ground voltage, and a cathode coupled to the second input node. The first capacitor has a first terminal coupled to the first node for receiving and storing the rectified voltage, and a second terminal coupled to the ground voltage.

In some embodiments, the supply circuit includes a first resistor, a second resistor, and a second capacitor. The first resistor has a first terminal coupled to the first node for receiving the rectified voltage, and a second terminal coupled to a supply node for outputting the supply voltage to the MCU. The second resistor has a first terminal coupled to the supply node, and a second terminal coupled to the ground voltage. The second capacitor has a first terminal coupled to the supply node, and a second terminal coupled to the ground voltage. The first inductor has a first terminal coupled to the first node for receiving the rectified voltage, and a second terminal coupled to a second node.

In some embodiments, the current compensation circuit includes a first transistor, a second inductor, and a third capacitor. The first transistor has a control terminal coupled to a control node for receiving a control voltage, a first terminal coupled to a third node, and a second terminal coupled to the supply node. The second inductor has a first terminal coupled to the third node, and a second terminal coupled to the second node for selectively outputting the additional current. The third capacitor has a first terminal coupled to the control node, and a second terminal coupled to a switch node.

In some embodiments, the power switch element includes a second transistor. The second transistor has a control terminal coupled to the switch node for receiving the clock voltage, a first terminal coupled to the ground voltage, and a second terminal coupled to the second node.

In some embodiments, the output stage circuit includes a fifth diode and a fourth capacitor. The fifth diode has an anode coupled to the second node, and a cathode coupled to an output node for outputting the output voltage. The fourth capacitor has a first terminal coupled to the output node, and a second terminal coupled to the ground voltage.

In some embodiments, the linear optical coupler includes an LED (Light-Emitting Diode) and a BJT (Bipolar Junction Transistor). The LED has an anode coupled to a division node for receiving a division voltage, and a cathode coupled to a fourth node. The BJT has a collector for outputting the feedback voltage to the MCU, and an emitter coupled to a fifth node.

In some embodiments, the feedback compensation circuit further includes a third resistor, a fourth resistor, a fifth resistor, a sixth resistor, a fifth capacitor, a sixth capacitor, and a voltage regulator. The third resistor has a first terminal coupled to the output node for receiving the output voltage, and a second terminal coupled to the division node for outputting the division voltage. The fourth resistor has a first terminal coupled to the division node, and a second terminal coupled to the ground voltage. The fifth resistor has a first terminal coupled to the output node, and a second terminal coupled to a sixth node. The sixth resistor has a first terminal coupled to the sixth node, and a second terminal coupled to the ground voltage. The fifth capacitor has a first terminal coupled to the fourth node, and a second terminal coupled to the sixth node. The sixth capacitor has a first terminal coupled to the fifth node, and a second terminal coupled to the ground voltage. The voltage regulator has an anode coupled to the ground voltage, a cathode coupled to the fourth node, and a reference terminal coupled to the sixth node.

In some embodiments, the MCU includes a comparator and a detection and control circuit. The comparator has a positive input terminal for receiving the feedback voltage, a negative input terminal for receiving a triangular-wave voltage, and an output terminal coupled to the switch node for outputting the clock voltage. The detection and control circuit monitors the duty cycle of the clock voltage, so as to generate the control voltage.

In some embodiments, if the duty cycle reaches the maximum threshold value, the detection and control circuit will output the control voltage having a high logic level for enabling the first transistor. If the duty cycle does not reach the maximum threshold value, the detection and control circuit will output the control voltage having a low logic level for disabling the first transistor.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
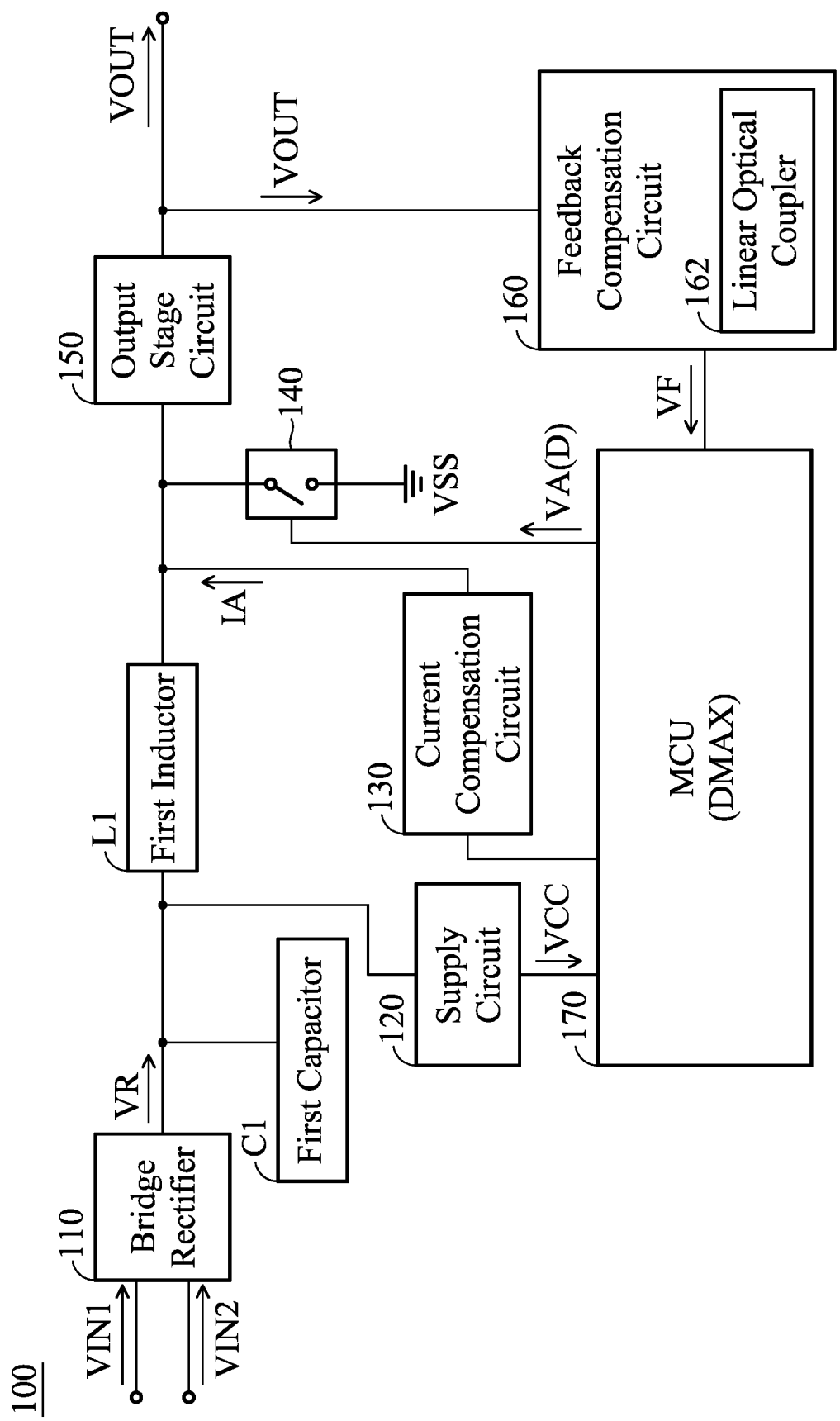
FIG. 1 is a diagram of a boost converter according to an embodiment of the invention.

FIG. 1 is a diagram of a boost converter 100 according to an embodiment of the invention. For example, the boost converter 100 may be applied to a desktop computer, a notebook computer, or an all-in-one computer. As shown in FIG. 1, the boost converter 100 includes a bridge rectifier 110, a first capacitor C1, a supply circuit 120, a first inductor L1, a current compensation circuit 130, a power switch element 140, an output stage circuit 150, a feedback compensation circuit 160, and an MCU (Microcontroller Unit) 170. It should be noted that the boost converter 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The first capacitor C1 stores the rectified voltage VR. The supply circuit 120 generates a supply voltage VCC according to the rectified voltage VR. The first inductor L1 receives the rectified voltage VR. The power switch element 140 selectively couples the first inductor L1 to a ground voltage VSS (e.g., 0V) according to a clock voltage VA. For example, if the clock voltage VA has a high logic level (e.g., a logic "1"), the power switch element 140 may couple the first inductor L1 to the ground voltage VSS (i.e., the power switch element 140 is similar to a short-circuited path). Conversely, if the clock voltage VA has a low logic level (e.g., a logic "0"), the power switch element 140 may not couple the first inductor L1 to the ground voltage VSS (i.e., the power switch element 140 is similar to an open-circuited path). The output stage circuit 150 is coupled to the first inductor L1 and the current compensation circuit 130, and is configured to generate an output voltage VOUT. For example, the output voltage VOUT may be a DC (Direct Current) voltage, whose voltage level may be about 400V, but it is not limited thereto. The feedback compensation circuit 160 generates a feedback voltage VF according to the output voltage VOUT. The feedback compensation circuit 160 includes a linear optical coupler 162. The MCU 170 is supplied by the supply voltage VCC, and is configured to generate the clock voltage VA according to the feedback voltage VF. Specifically, the MCU 170 is further configured to monitor and limit a duty cycle D of the clock voltage VA. If the duty cycle D reaches a maximum threshold value DMAX, the MCU 170 will enable the current compensation circuit 130 to provide an additional current IA, thereby increasing the output power of the boost converter 100. Conversely, if the duty cycle D does not reach the maximum threshold value DMAX, the MCU 170 will disable the current compensation circuit 130 to stop outputting the aforementioned additional current IA. With such a design, the boost converter 100 will not use the clock voltage VA with too large a duty cycle D, and their whole circuitry stability will be significantly improved.

The following embodiments will introduce the detailed structure and operation of the boost converter 100. It should be understood these figures and descriptions are merely exemplary, rather than limitations of the invention.

Figure 2:
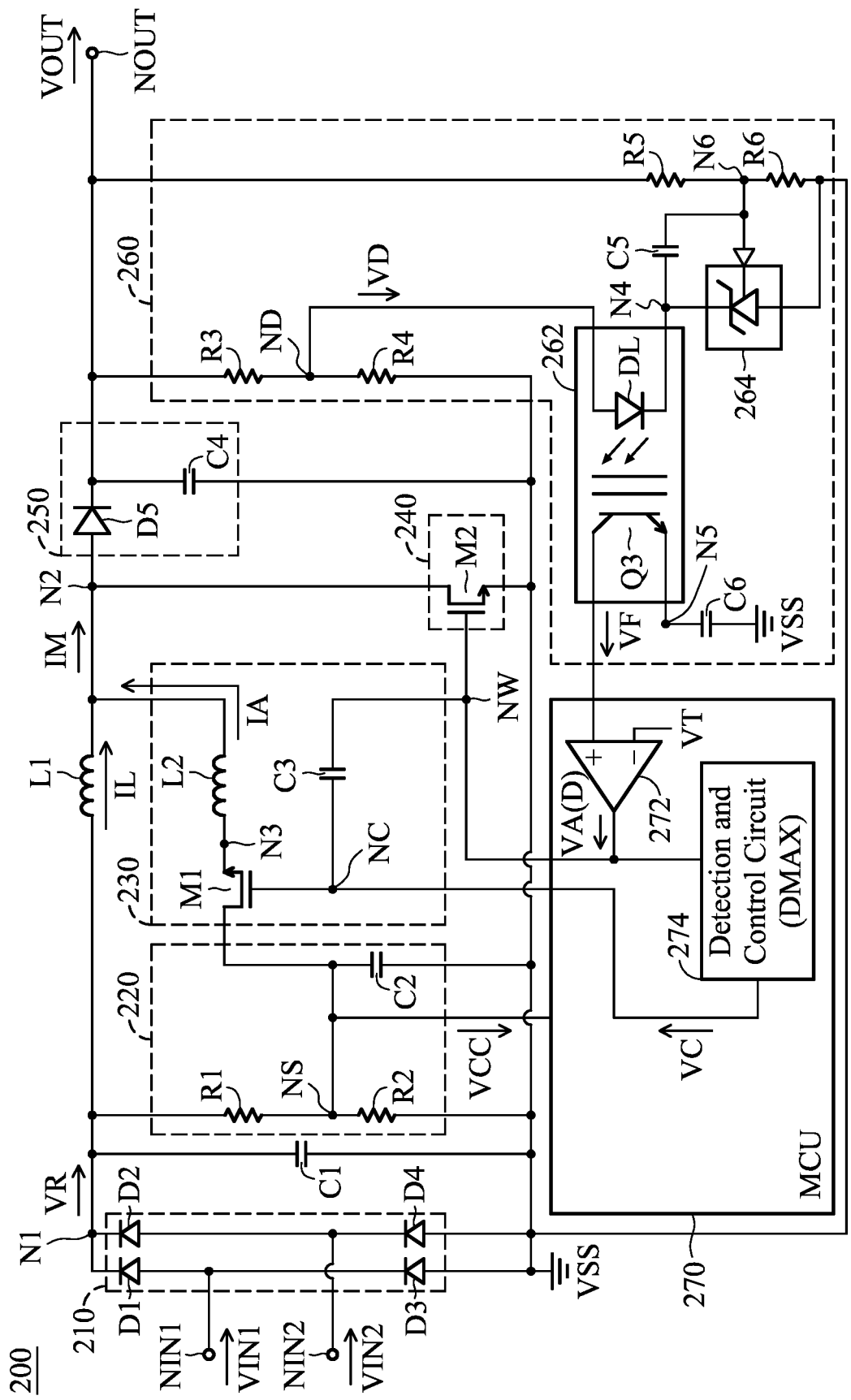
FIG. 2 is a diagram of a boost converter according to an embodiment of the invention.

FIG. 2 is a diagram of a boost converter 200 according to an embodiment of the invention. In the embodiment of FIG. 2, the boost converter 200 with a first input node NIN1, a second input node NIN2 and an output node NOUT includes a bridge rectifier 210, a first capacitor C1, a supply circuit 220, a first inductor L1, a current compensation circuit 230, a power switch element 240, an output stage circuit 250, a feedback compensation circuit 260, and an MCU 270. The first input node NIN1 and the second input node NIN2 of the boost converter 200 are arranged for receiving a first input voltage VIN1 and a second input voltage VIN2. The output node NOUT of the boost converter 200 is arranged for outputting an output voltage VOUT.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS, and a cathode coupled to the first input node NIN1. The fourth diode D4 has an anode coupled to the ground voltage VSS, and a cathode coupled to the second input node NIN2.

The first capacitor C1 has a first terminal coupled to the first node N1 for receiving and storing the rectified voltage VR, and a second terminal coupled to the ground voltage VSS.

The supply circuit 220 includes a first resistor R1, a second resistor R2, and a second capacitor C2. The first resistor R1 has a first terminal coupled to the first node N1 for receiving the rectified voltage VR, and a second terminal coupled to a supply node NS for outputting a supply voltage VCC to the MCU 270. The second resistor R2 has a first terminal coupled to the supply node NS, and a second terminal coupled to the ground voltage VSS. The second capacitor C2 has a first terminal coupled to the supply node NS, and a second terminal coupled to the ground voltage VSS.

The first inductor L1 has a first terminal coupled to the first node N1 for receiving the rectified voltage VR, and a second terminal coupled to a second node N2. An inductive current IL may flow through the first inductor L1.

The current compensation circuit 230 includes a first transistor M1, a second inductor L2, and a third capacitor C3. For example, the first transistor M1 may be an NMOS transistor (N-type Metal Oxide Semiconductor Field Effect Transistor or NMOSFET). The first transistor M1 has a control terminal (e.g., a gate) coupled to a control node NC for receiving a control voltage VC, a first terminal (e.g., a source) coupled to a third node N3, and a second terminal (e.g., a drain) coupled to the supply node NS. The second inductor L2 has a first terminal coupled to the third node N3, and a second terminal coupled to the second node N2 for selectively outputting an additional current IA. The third capacitor C3 has a first terminal coupled to the control node NC, and a second terminal coupled to a switch node NW. In some embodiments, a total current IM flowing into the second node N2 is defined according to the following equation (1):

$$IM=IL+IA \quad (1)$$

The power switch element 240 includes a second transistor M2. For example, the second transistor M2 may be an NMOS transistor. The second transistor M2 has a control terminal (e.g., a gate) coupled to the switch node NW for receiving a clock voltage VA, a first terminal (e.g., a source) coupled to the ground voltage VSS, and a second terminal (e.g., a drain) coupled to the second node N2. For example, if the clock voltage VA has a high logic level, the second transistor M2 may be enabled. Conversely, if the clock voltage VA has a low logic level, the second transistor M2 may be disabled.

The output stage circuit 250 includes a fifth diode D5 and a fourth capacitor C4. The fifth diode D5 has an anode coupled to the second node N2, and a cathode coupled to the output node NOUT. The fourth capacitor C4 has a first terminal coupled to the output node NOUT, and a second terminal coupled to the ground voltage VSS.

The feedback compensation circuit 260 includes a linear optical coupler 262, a voltage regulator 264, a third resistor R3, a fourth resistor R4, a fifth resistor R5, a sixth resistor R6, a fifth capacitor C5, and a sixth capacitor C6.

In some embodiments, the linear optical coupler 262 is implemented with a PC817 electronic component. The linear optical coupler 262 includes an LED (Light-Emitting Diode) DL and a BJT (Bipolar Junction Transistor) Q3 (e.g., an NPN type). The LED DL has an anode coupled to a division node ND for receiving a division voltage VD, and a cathode coupled to a fourth node N4. The BJT Q3 has a collector for outputting a feedback voltage VF to the MCU 270, and an emitter coupled to a fifth node N5.

The third resistor R3 has a first terminal coupled to the output node NOUT, and a second terminal coupled to the division node ND for outputting the division voltage VD. The fourth resistor R4 has a first terminal coupled to the division node ND, and a second terminal coupled to the ground voltage VSS. The fifth resistor R5 has a first terminal coupled to the output node NOUT, and a second terminal coupled to a sixth node N6. The sixth resistor R6 has a first terminal coupled to the sixth node N6, and a second terminal coupled to the ground voltage VSS. The fifth capacitor C5 has a first terminal coupled to the fourth node N4, and a second terminal coupled to the sixth node N6. The sixth capacitor C6 has a first terminal coupled to the fifth node N5, and a second terminal coupled to the ground voltage VSS.

In some embodiments, the voltage regulator 264 is implemented with a TL431 electronic component. The voltage regulator 264 has an anode coupled to the ground voltage VSS, a cathode coupled to the fourth node N4, and a reference terminal coupled to the sixth node N6.

The MCU 270 includes a comparator 272 and a detection and control circuit 274. Specifically, the comparator 272 has a positive input terminal for receiving the feedback voltage VF, a negative input terminal for receiving a triangular-wave voltage VT, and an output terminal coupled to the switch node NW for outputting the clock voltage VA. For example, if the feedback voltage VF is higher than or equal to the triangular-wave voltage VT, the comparator 272 may output the clock voltage VA having a high logic level. Conversely, if the feedback voltage VF is lower than the triangular-wave voltage VT, the comparator 272 may output the clock voltage VA having a low logic level.

The clock voltage VA has a duty cycle D. The detection and control circuit 274 monitors the duty cycle D of the clock voltage VA, so as to generate the control voltage VC. Specifically, the detection and control circuit 274 can compare the duty cycle D with a maximum threshold value DMAX. For example, if the duty cycle D reaches the maximum threshold value DMAX (i.e., D=DMAX), the detection and control circuit 274 can output the control voltage VC having a high logic level for enabling the first transistor M1. Conversely, if the duty cycle D does not reach the maximum threshold value DMAX (i.e., D<DMAX), the detection and control circuit 274 can output the control voltage VC having a low logic level for disabling the first transistor M1. In other words, the detection and control circuit 274 has a limiting function, and it can prevent the duty cycle D of the clock voltage VA from exceeding the maximum threshold value DMAX (i.e., D>DMAX).

Figure 3:
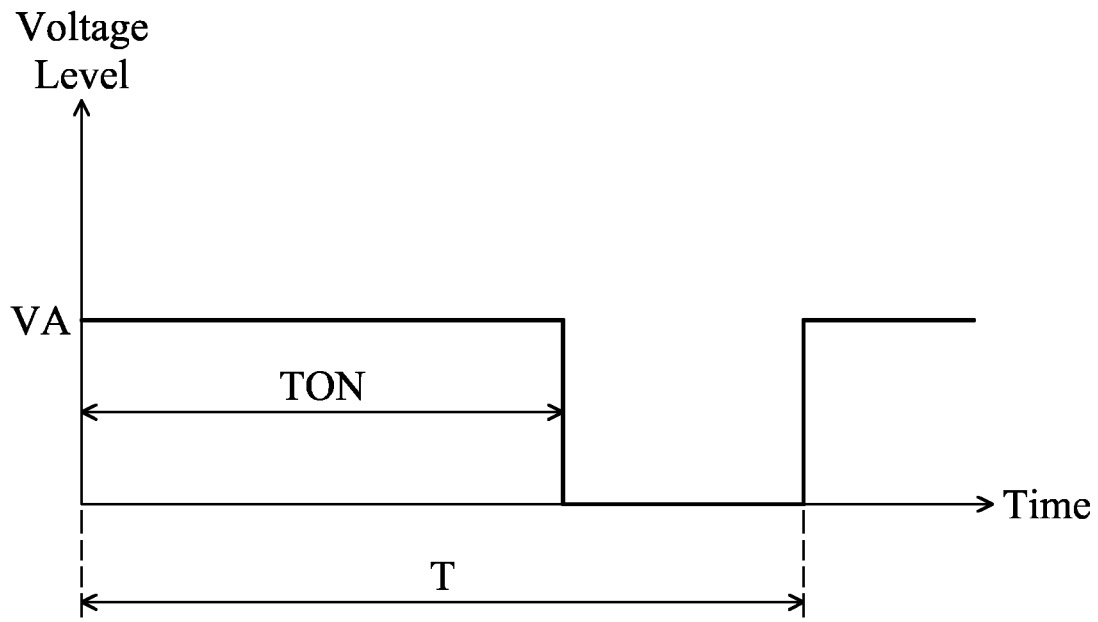
FIG. 3 is a diagram of a waveform of a clock voltage according to an embodiment of the invention.

FIG. 3 is a diagram of a waveform of the clock voltage VA according to an embodiment of the invention. The horizontal axis represents time, and the vertical axis represents the voltage level of the clock voltage VA. As shown in FIG. 3, in each complete duty T of the clock voltage VA, its high logic level has been maintained for duration time TON. In some embodiments, the duty cycle D of the clock voltage VA is defined according to the following equation (2):

$$D = \frac{TON}{T} \quad (2)$$

Figure 4:
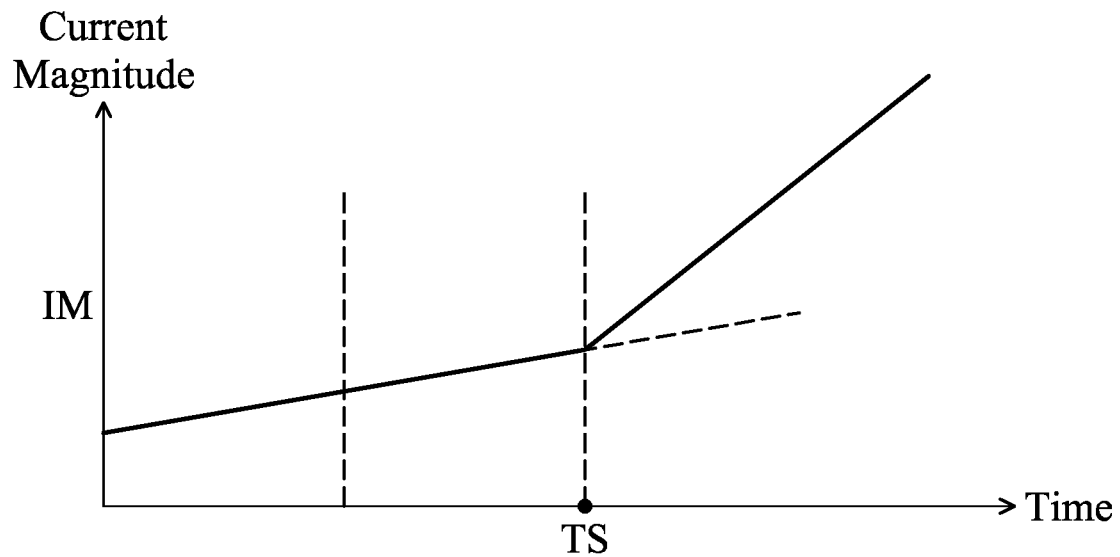
FIG. 4 is a diagram of a waveform of a total current according to an embodiment of the invention.

FIG. 4 is a diagram of a waveform of the total current IM according to an embodiment of the invention. The horizontal axis represents time, and the vertical axis represents the current magnitude of the total current IM. Initially, the duty cycle D of the clock voltage VA is very small, and the first transistor M1 is disabled. Thus, the current compensation circuit 230 does not output any additional current IA. When the relatively high output power is required, the duty cycle D of the clock voltage VA of the boost converter 200 gradually becomes larger, and both the inductive current IL and the total current IM are gradually increased. It should be noted that if the duty cycle D of the clock voltage VA reaches the maximum threshold value DMAX (e.g., at a specific time point TS), the detection and control circuit 274 will enable the first transistor M1, such that the current compensation circuit 230 can provide an additional current IA. At this time, the duty cycle D of the clock voltage VA is kept at the maximum threshold value DMAX, and the current magnitude of the total current IM is quickly increased due to the additional current IA, thereby effectively enhancing the output power of the boost converter 200. With such a design, since the duty cycle D of the clock voltage VA does not exceed the maximum threshold value DMAX, the circuitry stability of the boost converter 200 can be significantly improved. Furthermore, according to practical measurements, the incorporation of the third capacitor C3 can prevent high-frequency noise from interfering between the first transistor M1 and the second transistor M2 when both the first transistor M1 and the second transistor M2 are enabled.

In some embodiments, the element parameters of the boost converter 200 will be described as follows. The inductance of the first inductor L1 may be from 255 μH to 345 μH, such as 300 μH. The inductance of the second inductor L2 may be from 43.2 μH to 52.8 μH, such as 48 μH. The capacitance of the first capacitor C1 may be from 108 μF to 132 μF, such as 120 μF. The capacitance of the second capacitor C2 may be from 42.3 μF to 51.7 μF, such as 47 μF. The capacitance of the third capacitor C3 may be from 90 nF to 110 nF, such as 100 nF. The capacitance of the fourth capacitor C4 may be from 544 μF to 816 μF, such as 680 μF. The capacitance of the fifth capacitor C5 may be from 1.43 nF to 1.58 nF, such as 1.5 nF. The capacitance of the sixth capacitor C6 may be from 90 pF to 110 pF, such as 100 nF. The resistance of the first resistor R1 may be from 2.13 MΩ to 3.19 MΩ, such as 2.66 MΩ. The resistance of the second resistor R2 may be from 1.06 MΩ to 1.59 MΩ, such as 1.33 MΩ. The resistance of the third resistor R3 may be from 69.3 KΩ to 84.7 KΩ, such as 77 KΩ. The resistance of the fourth resistor R4 may be from 2.7 KΩ to 3.3 KΩ, such as 3 KΩ. The resistance of the fifth resistor R5 may be from 134.1 KΩ to 163.9 KΩ, such as 149 KΩ. The resistance of the sixth resistor R6 may be from 0.9 KΩ to 1.1 KΩ, such as 1 KΩ. The maximum threshold value DMAX may be 72%, 75%, or any value therebetween. The above ranges of parameters are calculated and obtained according to the results of many experiments, and they help to optimize the circuitry stability of the boost converter 200.

The invention proposes a novel boost converter, which can limit the maximum duty cycle of the clock voltage of the power switch element. According to practical measurements, since the boost converter using the aforementioned design can effectively improve the whole circuitry stability, it is suitable for application in a variety of devices.

Note that the above voltages, currents, resistances, inductances, capacitances and other element parameters are not limitations of the invention. A designer can adjust these parameters according to different requirements. The boost converter of the invention is not limited to the configurations of FIGS. 1-4. The invention may merely include any one or more features of any one or more embodiments of FIGS. 1-4. In other words, not all of the features displayed in the figures should be implemented in the boost converter of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A boost converter, comprising:
   a bridge rectifier, generating a rectified voltage according to a first input voltage and a second input voltage;
   a first capacitor, storing the rectified voltage;
   a supply circuit, generating a supply voltage according to the rectified voltage;
   a first inductor, receiving the rectified voltage;
   a current compensation circuit;
   a power switch element, selectively coupling the first inductor to a ground voltage according to a clock voltage;
   an output stage circuit, coupled to the first inductor and the current compensation circuit, and generating an output voltage;
   a feedback compensation circuit, generating a feedback voltage according to the output voltage, wherein the feedback compensation circuit comprises a linear optical coupler; and
   an MCU (Microcontroller Unit), supplied by the supply voltage, and generating the clock voltage according to the feedback voltage;
   wherein the MCU monitors and limits a duty cycle of the clock voltage, and if the duty cycle reaches a maximum threshold value, the MCU enables the current compensation circuit to provide an additional current, thereby increasing output power of the boost converter;
   wherein the bridge rectifier comprises:
   a first diode, wherein the first diode has an anode coupled to a first input node for receiving the first input voltage, and a cathode coupled to a first node for outputting the rectified voltage;
   a second diode, wherein the second diode has an anode coupled to a second input node for receiving the second input voltage, and a cathode coupled to the first node;

a third diode, wherein the third diode has an anode coupled to the ground voltage, and a cathode coupled to the first input node; and
a fourth diode, wherein the fourth diode has an anode coupled to the ground voltage, and a cathode coupled to the second input node;
wherein the first capacitor has a first terminal coupled to the first node for receiving and storing the rectified voltage, and a second terminal coupled to the ground voltage;
wherein the supply circuit comprises:
a first resistor, wherein the first resistor has a first terminal coupled to the first node for receiving the rectified voltage, and a second terminal coupled to a supply node for outputting the supply voltage to the MCU;
a second resistor, wherein the second resistor has a first terminal coupled to the supply node, and a second terminal coupled to the ground voltage; and
a second capacitor, wherein the second capacitor has a first terminal coupled to the supply node, and a second terminal coupled to the ground voltage;
wherein the first inductor has a first terminal coupled to the first node for receiving the rectified voltage, and a second terminal coupled to a second node;
wherein the current compensation circuit comprises:
a first transistor, wherein the first transistor has a control terminal coupled to a control node for receiving a control voltage, a first terminal coupled to a third node, and a second terminal coupled to the supply node;
a second inductor, wherein the second inductor has a first terminal coupled to the third node, and a second terminal coupled to the second node for selectively outputting the additional current; and
a third capacitor, wherein the third capacitor has a first terminal coupled to the control node, and a second terminal coupled to a switch node.

2. The boost converter as claimed in claim 1, wherein the power switch element comprises:
a second transistor, wherein the second transistor has a control terminal coupled to the switch node for receiving the clock voltage, a first terminal coupled to the ground voltage, and a second terminal coupled to the second node.

3. The boost converter as claimed in claim 1, wherein the output stage circuit comprises:
a fifth diode, wherein the fifth diode has an anode coupled to the second node, and a cathode coupled to an output node for outputting the output voltage; and
a fourth capacitor, wherein the fourth capacitor has a first terminal coupled to the output node, and a second terminal coupled to the ground voltage.

4. The boost converter as claimed in claim 3, wherein the linear optical coupler comprises an LED (Light-Emitting Diode) and a BJT (Bipolar Junction Transistor), wherein the LED has an anode coupled to a division node for receiving a division voltage, and a cathode coupled to a fourth node, and wherein the BJT has a collector for outputting the feedback voltage to the MCU, and an emitter coupled to a fifth node.

5. The boost converter as claimed in claim 4, wherein the feedback compensation circuit further comprises:
a third resistor, wherein the third resistor has a first terminal coupled to the output node for receiving the output voltage, and a second terminal coupled to the division node for outputting the division voltage;
a fourth resistor, wherein the fourth resistor has a first terminal coupled to the division node, and a second terminal coupled to the ground voltage;
a fifth resistor, wherein the fifth resistor has a first terminal coupled to the output node, and a second terminal coupled to a sixth node;
a sixth resistor, wherein the sixth resistor has a first terminal coupled to the sixth node, and a second terminal coupled to the ground voltage;
a fifth capacitor, wherein the fifth capacitor has a first terminal coupled to the fourth node, and a second terminal coupled to the sixth node;
a sixth capacitor, wherein the sixth capacitor has a first terminal coupled to the fifth node, and a second terminal coupled to the ground voltage; and
a voltage regulator, wherein the voltage regulator has an anode coupled to the ground voltage, a cathode coupled to the fourth node, and a reference terminal coupled to the sixth node.

6. The boost converter as claimed in claim 5, wherein the MCU comprises:
a comparator, wherein the comparator has a positive input terminal for receiving the feedback voltage, a negative input terminal for receiving a triangular-wave voltage, and an output terminal coupled to the switch node for outputting the clock voltage; and
a detection and control circuit, monitoring the duty cycle of the clock voltage, so as to generate the control voltage.

7. The boost converter as claimed in claim 6, wherein if the duty cycle reaches the maximum threshold value, the detection and control circuit outputs the control voltage having a high logic level for enabling the first transistor, and if the duty cycle does not reach the maximum threshold value, the detection and control circuit outputs the control voltage having a low logic level for disabling the first transistor.

* * * * *